(12) United States Patent
Kim

(10) Patent No.: US 11,546,497 B2
(45) Date of Patent: Jan. 3, 2023

(54) IMAGE CAPTURING SYSTEM WITH WIDE FIELD OF VIEW USING ROTATION MIRROR

(71) Applicant: Gachisoft Inc., Daejeon (KR)

(72) Inventor: Ho Yon Kim, Sejong (KR)

(73) Assignee: GACHISOFT INC., Daejeon (KR)

( * ) Notice: Subject to any disclaimer, the term of this patent is extended or adjusted under 35 U.S.C. 154(b) by 368 days.

(21) Appl. No.: 16/642,114

(22) PCT Filed: Feb. 13, 2020

(86) PCT No.: PCT/KR2020/002001
§ 371 (c)(1),
(2) Date: Feb. 26, 2020

(87) PCT Pub. No.: WO2021/153838
PCT Pub. Date: Aug. 5, 2021

(65) Prior Publication Data
US 2021/0405360 A1 Dec. 30, 2021

(30) Foreign Application Priority Data

Jan. 31, 2020 (KR) .................... 10-2020-0011659

(51) Int. Cl.
| | |
|---|---|
| *H04N 5/225* | (2006.01) |
| *H04N 5/232* | (2006.01) |
| *G01S 7/481* | (2006.01) |
| *G01S 17/08* | (2006.01) |
| *G03B 13/20* | (2021.01) |

(52) U.S. Cl.
CPC ......... *H04N 5/2259* (2013.01); *G01S 7/4817* (2013.01); *G01S 17/08* (2013.01); *G03B 13/20* (2013.01); *H04N 5/23238* (2013.01)

(58) Field of Classification Search
CPC ............ H04N 5/2259; H04N 5/23238; H04N 7/18–186; G03B 15/06; G03B 17/17; G03B 41/06; G03B 41/10; G02B 13/06; G02B 26/0816; G02B 26/105
See application file for complete search history.

(56) References Cited

U.S. PATENT DOCUMENTS

| | | | |
|---|---|---|---|
| 9,992,480 B1 * | 6/2018 | Gallagher | .............. B25J 9/1697 |
| 10,469,734 B2 | 11/2019 | Kim | |

(Continued)

FOREIGN PATENT DOCUMENTS

| | | |
|---|---|---|
| JP | 2006-155395 A | 6/2006 |
| JP | 2009-17434 A | 1/2009 |

(Continued)

OTHER PUBLICATIONS

Korean Office Action dated Mar. 9, 2021 in counterpart Korean Patent Application No. 10-2020-0011659 (6 pages in Korean).
Korean Notice of Allowance dated Jul. 29, 2021 in counterpart Korean Patent Application No. 10-2020-0011659 (4 pages in Korean).

(Continued)

*Primary Examiner* — Paul M Berardesca
(74) *Attorney, Agent, or Firm* — NSIP Law

(57) ABSTRACT

Disclosed are an image capturing system and method. In the image capturing system and method, a light path is changed by controlling a reflection angle of a mirror surface using a rotating mirror so that a single camera obtains consecutive images at various angles or at a wide photographing width.

11 Claims, 14 Drawing Sheets

(56) References Cited

U.S. PATENT DOCUMENTS

| | | | |
|---|---|---|---|
| 10,536,634 B2 * | 1/2020 | Lee | H04N 5/2259 |
| 10,726,287 B2 | 7/2020 | Kim | |
| 2004/0233277 A1 * | 11/2004 | Miller | H04N 5/2259 |
| | | | 348/148 |
| 2007/0103549 A1 * | 5/2007 | Lee | H04N 5/2259 |
| | | | 348/148 |
| 2007/0176083 A1 * | 8/2007 | Wimmer | B60R 11/04 |
| | | | 348/E5.09 |
| 2008/0185526 A1 * | 8/2008 | Horak | G01J 5/084 |
| | | | 250/353 |
| 2009/0135253 A1 * | 5/2009 | Augst | B60R 11/04 |
| | | | 348/148 |
| 2009/0303335 A1 * | 12/2009 | Stueckler | H04N 5/349 |
| | | | 348/222.1 |
| 2011/0141279 A1 * | 6/2011 | Cheng | H04N 5/2259 |
| | | | 348/E5.045 |
| 2017/0152061 A1 * | 6/2017 | Zhao | B64D 47/08 |
| 2017/0264829 A1 * | 9/2017 | Zhou | H04N 3/08 |
| 2018/0173987 A1 | 6/2018 | Kim | |
| 2018/0324349 A1 | 11/2018 | Kim | |
| 2021/0185198 A1 * | 6/2021 | Attar | H04N 5/2259 |

FOREIGN PATENT DOCUMENTS

| | | | |
|---|---|---|---|
| KR | 10-2005-0112264 A | 11/2005 | |
| KR | 10-2016-0146405 A | 12/2016 | |
| KR | 10-2018-0086741 A | 8/2018 | |
| KR | 10-2020675 B1 | 9/2019 | |
| WO | WO-2004084542 A1 * | 9/2004 | H04N 5/2259 |

OTHER PUBLICATIONS

International Search Report dated Oct. 26, 2020 in counterpart International Patent Application No. PCT/KR2020/002001 (3 pages in Korean).

Written Opinion dated Oct. 26, 2020 in counterpart International Patent Application No. PCT/KR2020/002001 (5 pages in Korean).

* cited by examiner

IMAGE CAPTURING SYSTEM WITH WIDE FIELD OF VIEW USING ROTATION MIRROR

TECHNICAL FIELD

The present invention relates to an image capturing system and method for widening a field of view or increasing a point of view of a camera while maintaining a lens magnification of the camera in order to obtain an image having a high resolution and excellent quality.

BACKGROUND ART

Generally, cameras for obtaining images include lenses and image sensors. Line scan cameras or area scan cameras are used to photograph moving objects. For example, in order to photograph an object moving thorough a mobile table such as a conveyor belt, light is applied to the object and then a line scan camera or an area scan camera detects the light reflected by the object to obtain image data.

Image obtaining technology using a line scan camera or an area scan camera may be applied to automation such as logistics, factory automation (FA), inspection processes, or the like according to the purpose of use, and the technology may have various applications such as inspection of a position, size, and shape of an object, reading of recognition marks or characters, defect inspection, and the like.

However, when a range to be photographed by a camera should be wide or an angle of the camera should vary, it is necessary to install multiple cameras. A camera body, a lens, and a mount are required in order to install one camera. A back-end image server is required in order to recognize an object or perform a post-processing. In the case of a camera with a frame rate that is a higher than necessary, when the camera is used for a place where frames do not overlap using remaining frames, economic efficiency may be increased.

DISCLOSURE

Technical Problem

The present invention is directed to providing an image capturing system and method for widening a field of view or increasing a point of view of a camera while maintaining a lens magnification of the camera in order to obtain an image having a high resolution and excellent quality.

Technical Solution

One aspect of the present invention provides an image capturing system including a rotating mirror configured to change a path of light input to a camera or allow light to pass therethrough according to a reflection angle of a mirror surface of the rotating mirror attached to a blade rotating about a rotation shaft, a mirror driver configured to rotate the rotating mirror, and the camera configured to obtain an image from light reflected by the rotating mirror or the light passing through the rotating mirror.

The rotating mirror may include a blade of which a mirror surface is perpendicular to the rotation shaft, and when the blade of the rotating mirror reveals the camera by rotating, the light may pass therethrough directly, and when the blade of the rotating mirror covers the camera, the light reflected by the rotating mirror may be incident on the camera.

The rotating mirror may have a plurality of blades which are stacked with respect to the rotation shaft, and the rotation shaft may be connected in the form of a universal joint such that the rotation shaft is perpendicular to a mirror surface of each of the blades, and each of the blades may be rotated by being attached to each of nodes of the rotation shaft.

The image capturing system may further include a controller configured to synchronize a rotational speed of the rotating mirror with a frame rate of the camera to rotate the rotating mirror such that the camera obtains a direct pass image or a mirror reflection image every frame and configured to synchronize a phase of the rotating mirror with a shutter of the camera.

Upon the rotation of the rotating mirror, when the mirror surface of the rotating mirror is opened, the camera may detect the light passing through the mirror surface of the rotating mirror to obtain a first image of an object and detect the light reflected by the mirror surface of the rotating mirror to obtain a second image of the object so that an angle of a single camera varies.

The image capturing system may further include a fixed mirror configured to change a path of the light reflected by or passing through the mirror surface of the rotating mirror.

The rotating mirror may be rotated about the rotation shaft parallel to the mirror surface to adjust the reflection angle.

The image capturing system may further include a measuring unit configured to detect at least one of a distance to an object, a position of the object, and a volume of the object to measure the distance to the object, and a controller configured to select a focused light path using the distance measured by the measuring unit and rotate the rotating mirror so as to have a reflection angle forming the selected light path.

The camera may include a lens, and an image sensor of which a sensor surface on which an image of an object is formed by the light passing through the lens is disposed not to be perpendicular to a central axis of the lens and to be inclined.

Another aspect of the present invention provides an image capturing method including rotating a rotating mirror about a rotation shaft, changing a path of light input to a camera or allowing light to pass therethrough according to a reflection angle of a mirror surface of the rotating mirror attached to a blade rotating about a rotation shaft when a rotating mirror rotates, and consecutively obtaining images from light reflected by the rotating mirror or from the light passing through the rotating mirror using the camera.

In the consecutively obtaining, upon the rotation of the rotating mirror, when the mirror surface of the rotating mirror is opened, the camera may detect the light passing through the mirror surface of the rotating mirror to obtain a first image of an object and detect the light reflected by the mirror surface of the rotating mirror to obtain a second image of the object. The image capturing method may further include changing the path of the light reflected by or passing through the mirror surface of the rotating mirror.

The image capturing method may further include selecting one or more images which are in focus among the plurality of images obtained consecutively and recognizing an identification mark of an object included in the corresponding image.

The image capturing method may further include measuring a distance to an object, wherein, in the changing of the path of the light or the allowing of the light to pass therethrough, a light path for obtaining a focused image from the object may be selected based on the measured distance.

In the rotating of the rotating mirror about the rotation shaft, a rotational speed of the rotating mirror may be synchronized with a frame rate of the camera to rotate the rotating mirror such that the camera obtains a direct pass image or a mirror reflection image every frame.

Advantageous Effects

According to an image capturing system and method according to an embodiment, an angle of the camera may vary by controlling a reflection angle of a mirror surface of a rotating mirror formed in front of a camera and thus different objects can be photographed using a single camera. A photographing width of the camera can be increased by controlling the reflection angle of the mirror surface of the rotating mirror and thus a wide object can be photographed using a single camera. Furthermore, a field of view and a focal length of a single camera can be adjusted by controlling the reflection angle of the mirror surface of the rotating mirror and thus the field of view of the camera can be widened, images having various fields of view can be obtained, or images of objects having various heights can be obtained.

MODES OF THE INVENTION

Figure 1:
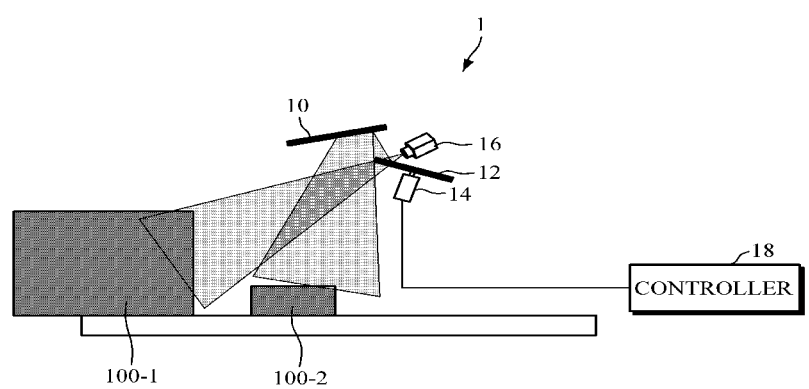
FIG. 1 is a view illustrating a structure of an image capturing system according to a first embodiment of the present invention.

Advantages and features of the present invention and methods of achieving the same will be clearly understood with reference to the accompanying drawings and embodiments described in detail below. However, the present invention is not limited to the embodiments to be disclosed below but may be implemented in various different forms. The embodiments are provided in order to fully explain the present embodiments and fully explain the scope of the present invention for those skilled in the art. The scope of the present invention is only defined by the appended claims. Like reference numerals refer to like elements throughout the specification.

In addition, when the embodiments of the present invention are described, if it is determined that detailed descriptions of known technology related to the present invention unnecessarily obscure the subject matter of the present invention, detailed descriptions thereof will be omitted. Some terms described below are defined by considering functions in the present invention, and meanings may vary depending on, for example, a user or operator's intentions or customs. Therefore, the meanings of terms should be interpreted based on the scope throughout this specification.

In this case, it will be appreciated that each block of block diagrams and combinations of steps of flowcharts may be performed by computer program instructions (an execution engine). Since the computer program instructions may be embedded in a processor of a general purpose computer, special purpose computer, or other programmable data processing devices, the instructions executed through the processor of the computer or other programmable data processing devices generate a means for performing the functions described in the block(s) of the block diagrams or the step(s) of the flowcharts.

Since the computer program instructions may be stored in a computer usable or computer readable memory that can be directed to a computer or other programmable data processing devices to implement functionality in a particular manner, the instructions stored in the computer usable or computer readable memory may produce a manufactured item containing an instruction means for performing the functions described in the block(s) of the block diagrams or the step(s) of the flowcharts.

Since the computer program instructions may also be installed in a computer or other programmable data processing devices, instructions for performing a series of operating steps on a computer or other programmable data processing devices to generate a computer-implemented process to be performed on the computer or other programmable data processing devices may provide steps for performing the functions described in the block(s) of the block diagrams or the step(s) of the flowcharts.

In addition, each block or step may represent a module, segment, or portion of code that includes one or more executable instructions for executing a specified logical function(s). It should also be noted that in some alternative implementations, the functions mentioned in the blocks or steps may occur out of order. For example, two blocks or steps illustrated in succession may in fact be executed substantially concurrently or the blocks may sometimes be executed in the reverse order depending on the corresponding function.

Hereinafter, various embodiments of the present invention will be described in detail with reference to the accompanying drawings. However, the embodiments of the present invention may be modified in several different forms, and the scope of the present invention is not limited to the embodiments to be described below. The embodiments of the present invention are provided to fully explain the invention to those skilled in the art.

A camera having an area image sensor may perform continuous photographing (video). In this case, when the camera photographs a moving object (a moving body, hereinafter referred to as the "moving body"), many pieces of redundant information are generated. As the performance of the camera increases, the above situation occurs more. However, when a speed of a moving object is not that fast, such a camera will not be used even when a frame rate is high.

On the contrary, when a range to be photographed by a camera should be wide or an angle of the camera should vary, it is necessary to install multiple cameras. A camera body, a lens, and a mount are required in order to install one camera. A back-end image server is required in order to recognize an object or perform a post-processing. In the case of a camera with a frame rate that is a higher than necessary, when the camera is used for a place where frames do not overlap using remaining frames, economic efficiency may be increased. There is a method in which a mirror is placed in front of a camera and an angle of the camera is changed while adjusting a reflection angle of the mirror by controlling the mirror by a mirror driver. However, for example, when a frame rate of the camera is 30 fps, there may be a mechanical problem in controlling an angle of the mirror to change the angle of the mirror 30 times per second using the above method. The present invention relates to a system and method in which a single camera obtains consecutive images at different angles or at a wide angle using a method different from the above method.

Hereinafter, an image capturing system having the above-described features and an image obtaining method using the same will be described in detail with reference to the accompanying drawings to be described below.

FIG. 1 is a view illustrating a structure of an image capturing system according to a first embodiment of the present invention.

Referring to FIG. 1, an image capturing system 1 may include a rotating mirror 12, a mirror driver 14, and a camera 16 and may further include a fixed mirror 10 and a controller 18. The rotating mirror 12 changes a path of light input to the camera 16 or passes the light therethrough according to a reflection angle of a mirror surface attached to a blade rotating around a rotation shaft. For example, the rotating mirror 12 adjusts the reflection angle while being rotated about the rotation shaft in front of a lens of the camera 16 and allows light reflected by objects 100-1 and 100-2 to pass therethrough or allows the light reflected by the objects 100-1 and 100-2 to be incident on the camera 16. The blade of the rotating mirror 12 may be rotated in a direction perpendicular to a rotation direction of the rotation shaft. The rotating mirror 12 may be rotated at a certain speed and may be rotated when a control signal of the controller 18 is applied thereto. The mirror driver 14 rotates the rotating mirror 12. The mirror driver 14 may be a motor. The objects 100-1 and 100-2 may be moving bodies. For example, the objects 100-1 and 100-2 may be objects which move due to a moving table such as a conveyor belt.

The camera 16 detects the light passing through the rotating mirror 12 to obtain a first image and detects the light reflected by the rotating mirror 12 to obtain a second image. For example, the camera 16 may obtain the first image from the light (which is not reflected by the rotating mirror), which passes through the rotating mirror 12 from a first object 100-1 and may obtain the second image from the light, which is reflected by the rotating mirror 12 from the second object 100-2. In FIG. 1, the camera 16 targets different objects 100-1 and 100-2, but the objects may be the same.

The controller 18 applies a control signal to the mirror driver 14 to rotate the rotating mirror 12. The controller 18 synchronizes a rotational speed of the rotating mirror 12 with a frame rate (fps) of the camera 16 to rotate the rotating mirror 12 so that the camera 16 obtains a direct pass image or a mirror reflection image every frame. In addition, the controller 18 synchronizes a phase of the rotating mirror 12 with a shutter of the camera 16. For example, when four shots are taken per a rotation of the rotating mirror 12, the rotating mirror 12 may perform 7.5 rotations per second. Of course, the phase of the rotating mirror 12 should also be synchronized with the shutter of the camera 16. In the above configuration, one camera having a 30 fps frame rate has the same effect as two cameras having a 15 fps frame rate which are installed at different angles.

The fixed mirror 10 is provided in a fixed state to change a path of the light passing through the rotating mirror 12. The fixed mirror 10 for changing the path of the light passing through the rotating mirror 12 may or may not be present.

Figure 2:
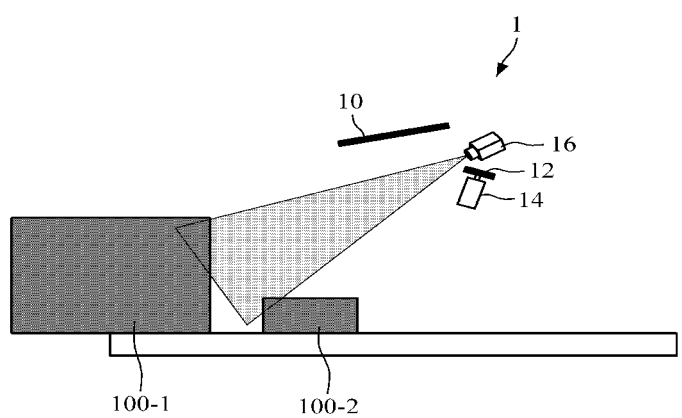
FIG. 2 is a view illustrating an example in which a camera of the image capturing system according to the first embodiment of the present invention obtains a direct pass image.

FIG. 2 is a view illustrating an example in which a camera of the image capturing system according to the first embodiment of the present invention obtains a direct pass image. Referring to FIG. 2, when the blade of the rotating mirror 12 being rotated does not cover the camera 16, the camera 16 directly detects light reflected by an object 100-1 to obtain an image directly.

Figure 3:
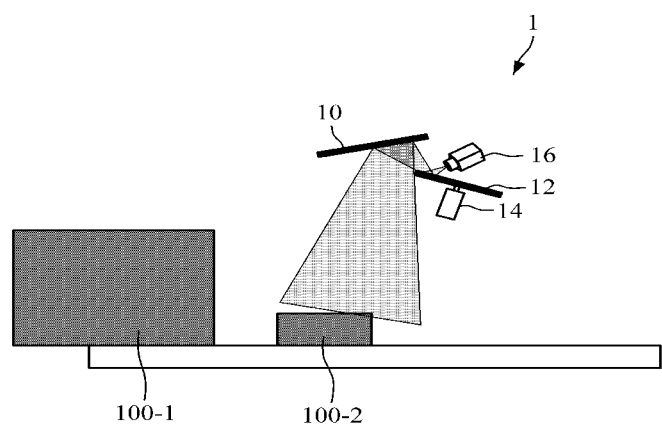
FIG. 3 is a view illustrating an example in which the camera of the image capturing system according to the first embodiment of the present invention obtains a mirror reflection image.

FIG. 3 is a view illustrating an example in which the camera of the image capturing system according to the first embodiment of the present invention obtains a mirror reflection image. Referring to FIG. 3, when the rotating mirror 12 being rotated covers the lens of the camera 16, the camera 16 detects light reflected by the rotating mirror 12 to obtain an image. When the fixed mirror 10 is present, the light reflected by the fixed mirror 10 is reflected again by the rotating mirror 12 so that the camera 16 may detect the light reflected by the rotating mirror 12 to obtain an image.

Figure 4:
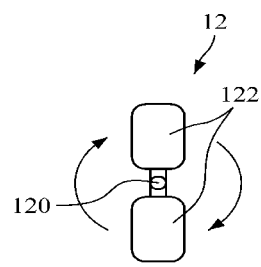
FIG. 4 is a view illustrating a first structure of a rotating mirror according to the first embodiment of the present invention.

FIG. 4 is a view illustrating a first structure of the rotating mirror according to the first embodiment of the present invention.

Referring to FIG. 4, the rotating mirror 12 is rotated about the rotation shaft 120 and has blades 122. The mirror surface of the rotating mirror 12 is perpendicular to the rotation shaft 120 and is rotated about the rotation shaft 120 like a propeller.

Figure 5:
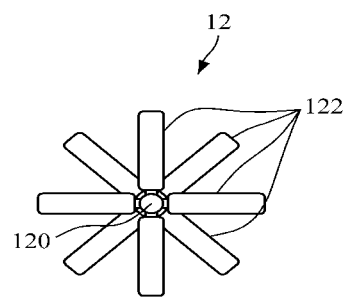
FIG. 5 is a view illustrating a second structure of the rotating mirror according to the first embodiment of the present invention.

FIG. 5 is a view illustrating a second structure of the rotating mirror according to the first embodiment of the present invention.

Referring to FIG. 5, a rotating mirror 12 according to the embodiment has a plurality of blades 122 which are stacked with respect to a rotation shaft 120 and has a structure in which a reflection surface is changed by varying a bending angle of each of the blades 122. In this case, degrees to which the blades 122 bend backward may be different, or there may be an open blade 122. It was confirmed through experiments that when the mirror surface of the rotating mirror 12 is not perpendicular to the rotation shaft 120 and is bent, an obtained image is shaken and thus it is difficult to obtain a clean image. Thus, in order to replace the above configuration, there is a configuration in which the rotation shaft 120 may be connected in the form of a universal joint (e.g., a flexible bit or a cobra bit (drill)) so that the rotation shaft 120 is perpendicular to the mirror surface of the rotating mirror 12 and each of the blades 122 of the rotating mirror 12 may be rotated by being attached to each of nodes of the rotation shaft 120.

Figure 6:
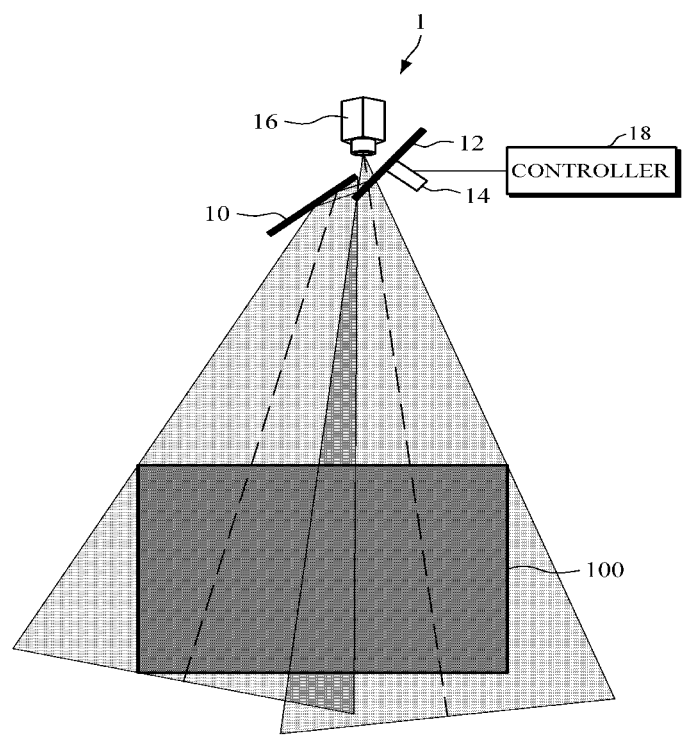
FIG. 6 is a view illustrating a configuration of an image capturing system according to an embodiment of the present invention in which a photographable range of a camera is increased.

FIG. 6 is a view illustrating a configuration of an image capturing system according to an embodiment of the present invention, in which a photographable range of a camera is increased.

Referring to FIG. 6, in an image capturing system 1 according to the embodiment, a camera 16 may photograph at various angles as in the image capturing system described above with reference to FIG. 1, and a resolution of the camera 16 may be increased. That is, a high frame rate of the camera 16 is used to capture an image in a wider range. The above method is a method of increasing a photographable range of a single camera 16 by obtaining segmented images using the rotating mirror 12.

Referring to FIG. 6, two sides of one object 100 may be alternately photographed using the rotating mirror 12 rotated by the mirror driver 14, thereby obtaining an effect of photographing a wide range. That is, a plurality of fields of view may be obtained using the rotation of the rotating mirror 12, thereby increasing a photographable range. For example, when a blade of the rotating mirror 12 is at a position not covering the camera 16 during the rotation of the rotating mirror 12, the camera 16 directly detects light reflected by one side (e.g., a right side) of the object 100 to obtain a second segmented image of the object 100. On the contrary, when the blade of the rotating mirror 12 is at a position covering the camera 16 during the rotation of the rotating mirror 12, the camera 16 detects light, which is reflected by the rotating mirror 12 from the object 100, to obtain a first segmented image from another side (e.g., a left side) of the object 100. In this case, the controller 18 controls the reflection angle using the rotation of the rotating mirror 12 so that the camera 16 obtains the first segmented image and the second segmented image of the object 100. Accordingly, in the case in which the camera 16 photographs a wide object 100, when a field of view of the camera is narrow, the single camera 16 may photograph the wide object 100 by widening the field of view using the rotating mirror 12 which rotates rapidly.

Figure 7:
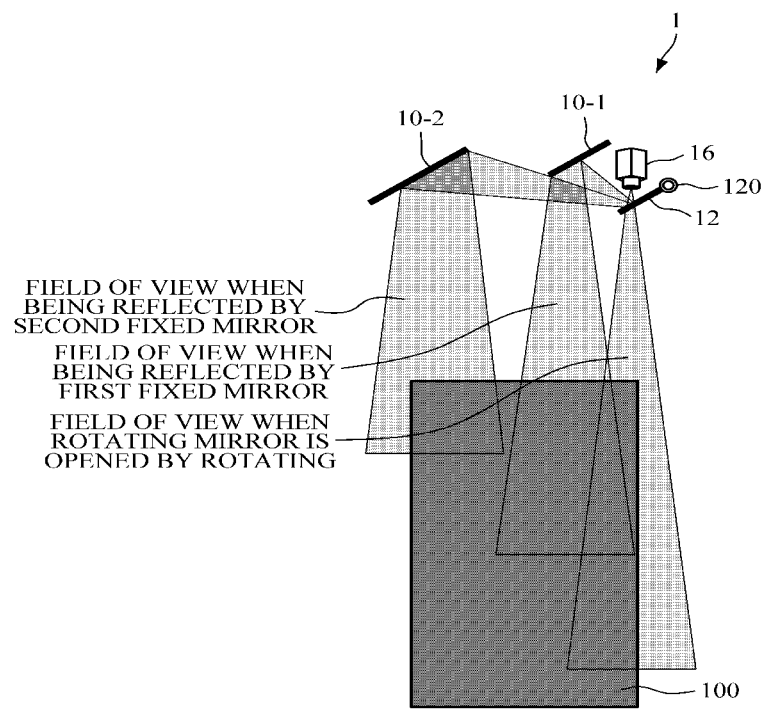
FIG. 7 is a side view illustrating a structure of an image capturing system according to a second embodiment of the present invention.

FIG. 7 is a side view illustrating a structure of an image capturing system according to a second embodiment of the present invention.

Referring to FIG. 7, an image capturing system 1 adjusts a reflection angle of a rotating mirror 12 which rotates to change a light path and thus adjusts a field of view and a focal length of a camera 16.

Generally, when a distance between a camera and an object is large, a zoom lens should be used in order to obtain a resolution of a certain level or more. When the zoom lens is not used, a lens having a short focal length should be used in order to photograph both near and far objects. In this case, when a distance to the object is slightly increased, a resolution (a resolution of the object) is sharply reduced. In order to compensate for the above disadvantage, several cameras are used. The zoom lens may be used, but in the case of using the zoom lens, repeated zoom adjustments may affect durability of the lens in an industrial site or a distribution center, or the zoom lens may be difficult to adjust at high speed. In order to address the above problem, the present invention proposes a method in which a field of view and a focal length are changed by selectively changing a light path using a reflection mirror that can automatically adjust a reflection angle thereof. There is a difference in that the rotating mirror of the image capturing system described above with reference to FIG. 1 is rotated about the rotation shaft perpendicular to the mirror surface such as a propeller to adjust the reflection angle, whereas the rotating mirror 12 of FIG. 7 adjusts the reflection angle while being rotated about the rotation shaft 120 parallel to a mirror surface.

Hereinafter, the structure of the image capturing system of FIG. 7 will be described.

Referring to FIG. 7, the image capturing system includes a first fixed mirror 10-1, a second fixed mirror 10-2, and the rotating mirror 12.

The rotating mirror 12 is formed in front of the camera 16, changes a light path by adjusting a reflection angle while being rotated about the rotation shaft 120, and thus adjusts a field of view and a focal length of the camera 16. For example, when the reflection angle of the mirror surface of the rotating mirror 12 is directed to the first fixed mirror 10-1, the camera 16 forms a first field of view and a first focal length and obtains a first image which is reflected by the first fixed mirror 10-1 from an object 100. When the reflection angle of the mirror surface of the rotating mirror 12 is directed to the second fixed mirror 10-2, the camera 16 forms a second field of view and a second focal length and obtains a second image of the object 100 which is reflected by the second fixed mirror 10-2 from the object 100. When the mirror surface of the rotating mirror 12 is opened, the camera 16 forms a third field of view and a third focal length and obtains a third image of the object 100 passing through the rotating mirror 12 from the object 100.

Figure 8:
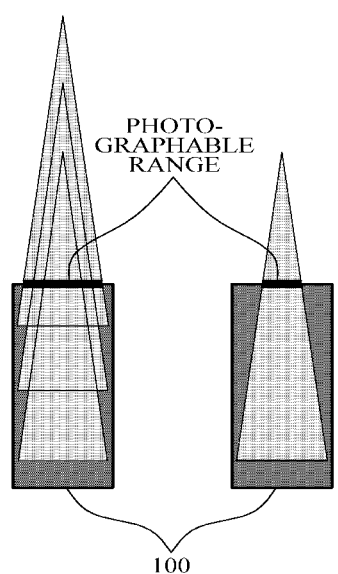
FIG. 8 is a front view illustrating the structure of the image capturing system according to the second embodiment of the present invention.

FIG. 8 is a front view illustrating the structure of the image capturing system according to the second embodiment of the present invention.

Referring to FIG. 8, it is possible to adjust the focal lengths of the camera 16 while securing the wide field of view of the camera by changing the light path of the camera using the rotating mirror 12. As illustrated in FIG. 8, it may be configured such that the rotating mirror 12 is placed in front of the camera 16, and light reflected by the first fixed mirror 10-1 and light reflected by the second fixed mirror 10-2 are reflected to be directed to the object 100 while rotating the rotating mirror 12. In this way, not only a focal plane may be adjusted but also a photographable range may be adjusted, and thus the photographable range may be widened using only one camera 16 as illustrated on a left side of FIG. 8. In this case, when the light path of the camera 16 is changed, a distance from the camera 16 to the focal plane of the object 100 is also changed, and thus identification marks of respective objects may be recognized with respect to objects having different heights.

Figure 9:
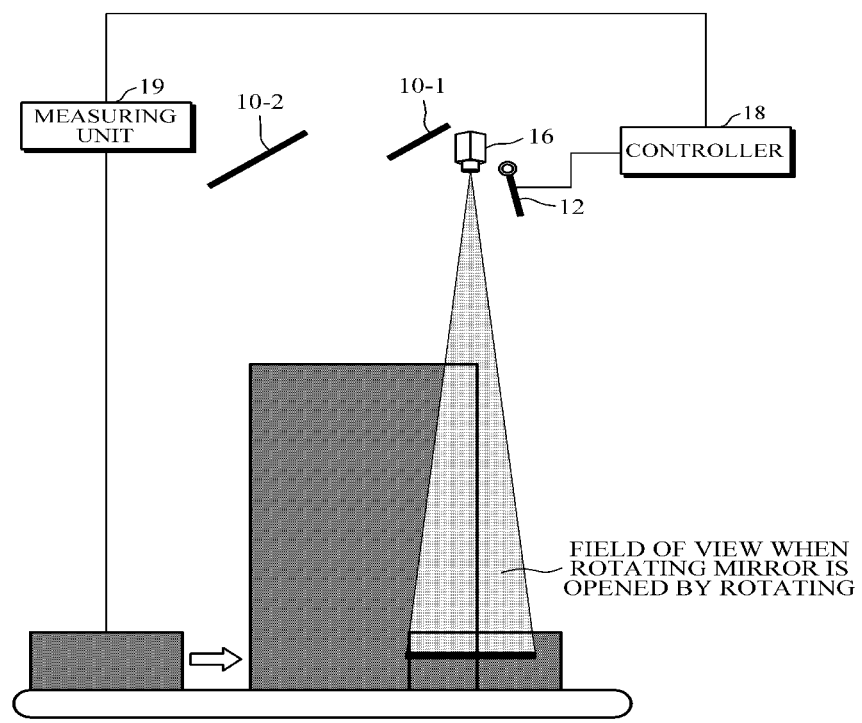
FIGS. 9 to 11 are views illustrating examples in which a field of view and a focal length of a camera are adjusted by adjusting a reflection angle by the rotation of a rotating mirror of the image capturing system according to the second embodiment of the present invention.
Figure 10:
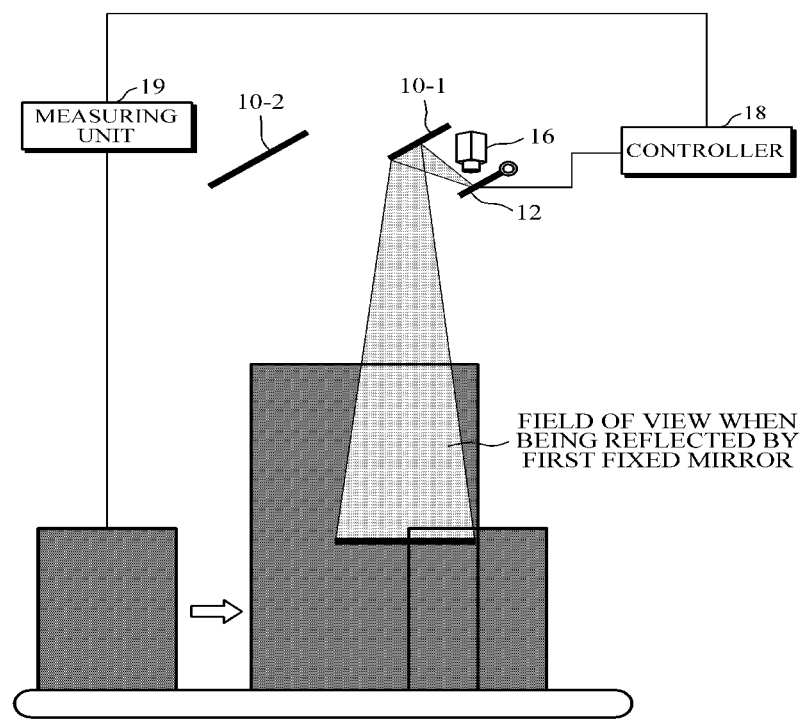
Figure 11:
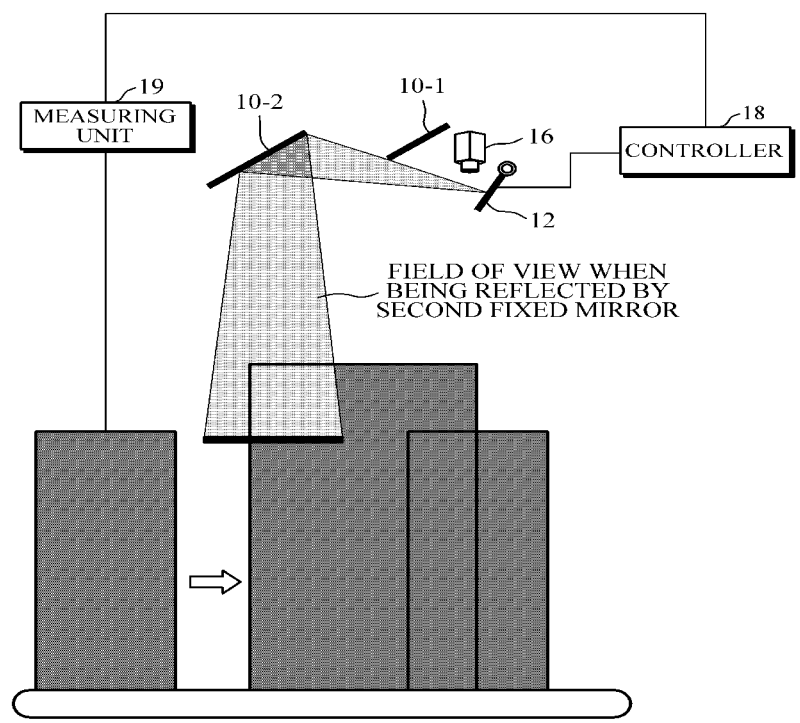

FIGS. 9 to 11 are views illustrating examples in which the field of view and the focal length of the camera are adjusted by adjusting the reflection angle by the rotation of the rotating mirror of the image capturing system according to the second embodiment of the present invention.

Main targets of the image capturing system are objects having a large difference in height, and a goal of the image capturing system is to recognize identification marks on upper ends of the objects by photographing the objects. The identification marks include barcodes, quick response (QR) codes, characters, figures, and the like. Hereinafter, a description will be made based on the barcodes, but the present invention is not limited thereto.

A pallet loaded with boxes may have a height in a range of 500 mm to 1,900 mm. In order to find out which goods are loaded thereon, barcodes printed on the box should be recognized. Pallets may be moved by forklift trucks or on pallet conveyors. The pallets may be moved by transport robots or unmanned forklift trucks in the future. Although a transfer speed is not very fast, it is necessary to manage the loading and unloading of pallets when the pallets enter or are released and to automate such a process. Because of large variations in height of the pallets, multiple cameras are usually required to handle the variations. However, in the image capturing systems according to the embodiments, it is desirable to achieve the above handling using one camera or a few cameras.

Cameras have focus problems and problems of field of view. When a field of view of the camera is widened, a resolution rapidly decreases as a distance increases. When the field of view of the camera is narrow, an installation distance should be increased. Both of the above cases require automatic focus adjustment on the basis of the distance. In the present invention, various light paths are formed by controlling a reflection angle by the rotation of the rotating mirror 12 so that a field of view and a focal length of the camera are adjusted. To this end, a measuring unit 19 may detect at least one of a distance to the object, a position of the object, and a volume of the object to measure the distance to the object. The measuring unit 19 may simply measure the distance to the object using an ultrasonic wave, an infrared sensor, or the like or may measure the position or the volume of the object using a three-dimensional sensor or the like. That is, the distance to the object, which may vary according to the size of the object, may be measured more accurately.

The controller 18 obtains information about the distance measured by the measuring unit 19 and determines a height of the object using the obtained information about the measured distance. In addition, the controller 18 selects a light path for focusing the determined height of the object and rotates the rotating mirror 12 by applying a control signal to a mirror driver (not illustrated) such that the rotating mirror 12 has a reflection angle forming the selected light path. The object may be a cargo or a pallet carrying the cargo. The camera 16 photographs the objects by controlling the reflection angle by the rotation of the rotating mirror 12 while the objects having different heights pass therethrough, forms a focal plane on an upper surface of the object according to the height of each object, and obtains an image from the corresponding focal plane.

Referring to FIG. 9, when the mirror surface of the rotating mirror 12 is opened by rotating the rotating mirror 12, the camera 16 may form a third field of view and a third focal length to obtain an image passing through the rotating mirror 12 from a cargo (pallet) having a small height. In this case, since a focus is formed on the upper surface of the cargo (pallet) having a low height, the camera 16 is suitable to recognize an identification mark of the cargo (pallet) having a low height.

Referring to FIG. 10, when the reflection angle of the mirror surface of the rotating mirror 12 is directed to a first fixed mirror 10-1 by rotating the rotating mirror 12, the camera 16 may form a first field of view and a first focal length to obtain an image reflected by the first fixed mirror 10-1 from a cargo (pallet) having a medium height. In this case, since a focus is formed on the upper surface of the cargo (pallet) having a medium height, the camera 16 is suitable to recognize an identification mark of the cargo (pallet) having a medium height.

Referring to FIG. 11, when the reflection angle of the mirror surface of the rotating mirror 12 is directed to a second fixed mirror 10-2 by rotating the rotating mirror 12, the camera 16 may form a second field of view and a second focal length to obtain an image reflected by the second fixed mirror 10-2 from a cargo (pallet) having a high height. In this case, since a focus is formed on the upper surface of the cargo (pallet) having a high height, the camera 16 is suitable to recognize an identification mark of the cargo (pallet) having a high height.

Figure 12:
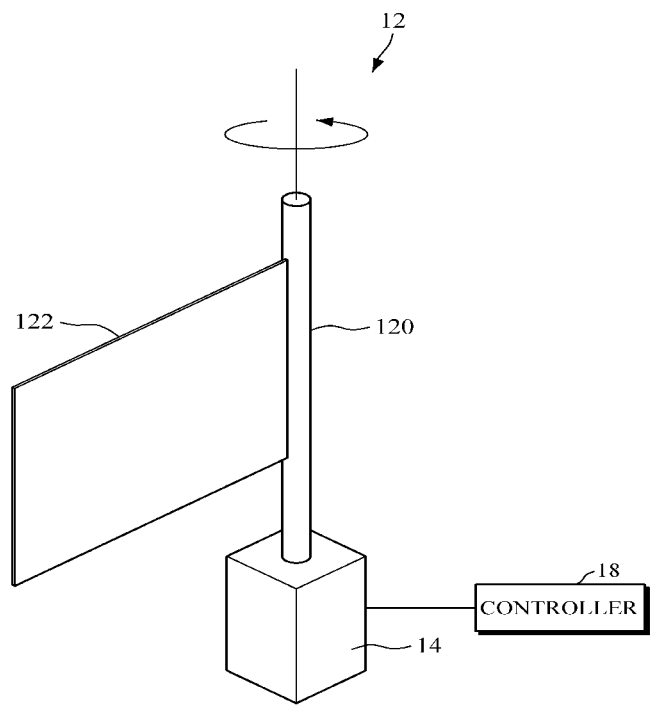
FIG. 12 is a view illustrating a structure of the rotating mirror according to the second embodiment of the present invention.

FIG. 12 is a view illustrating a structure of the rotating mirror according to the second embodiment of the present invention.

Referring to FIG. 12, the rotating mirror 12 is rotated about the rotation shaft 120 and the mirror surface of the rotating mirror 12 is parallel to the rotation shaft 120. The rotating mirror 12 is connected to the mirror driver 14, and the mirror driver 14 rotates the rotation shaft 120 in response to a control signal of the controller 18 to rotate the rotating mirror 12 fixed to the rotation shaft 120. The reflection angle of the mirror surface of the rotating mirror 12 may be changed by the rotation of the rotating mirror 12, and the field of view and the focal length of the camera may be adjusted using the changed reflection angle.

Figure 13:
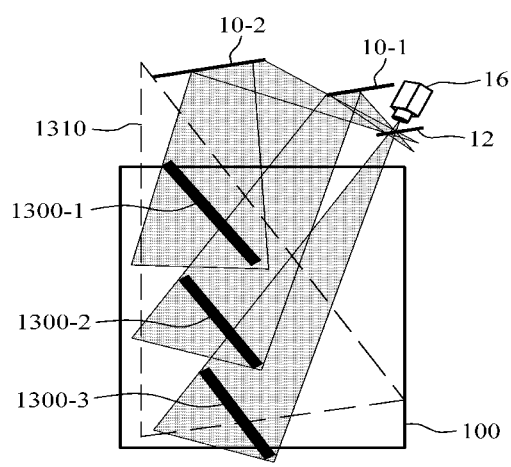
FIG. 13 is a view illustrating a structure of the image capturing system in which focal planes operable with respect to an entire height of an object of a camera according to an embodiment of the present invention are formed.

FIG. 13 is a view illustrating a structure of the image capturing system in which focal planes operable with respect to an entire height of an object of a camera according to an embodiment of the present invention are formed.

As described above with reference to FIGS. 7 and 8, the focal plane of the object is divided into several pieces even when the light paths are different, and the object located between the focal planes may not be in focus. Therefore, a separate automatic focus adjusting device for focusing is required. A camera 16 according to the embodiment tilts an image sensor while illuminating a lighting 1310 and captures an image using the inclined sensor surface, and thus a focal plane operable with respect to an entire height of the object 100 is generated without a separate automatic focus adjusting device as illustrated in FIG. 13.

Generally, an image sensor of a camera is disposed parallel to a lens, that is, perpendicular to a central axis of the lens. However, in the camera 16 according to the embodiment, an image sensor is disposed to be inclined. The image sensor is disposed to be inclined so that a first point corresponding to a minimum distance from the lens to the object 100 and a second point corresponding to a maximum distance from the lens to the object 100, which are changed according to a size or a moving position of the object 100, are located at two ends of a sensor surface of the image sensor. In this case, focal planes 1300-1, 1300-2, and 1300-3 of the object 100, which correspond to the sensor surface of the inclined image sensor, are also generated to be inclined as illustrated in FIG. 13. According to the rotation of the rotating mirror 12, a first focal plane 1300-1 formed when the reflection angle of the mirror surface of the rotating mirror 12 is directed to the second fixed mirror 10-2, a second focal plane 1300-2 formed when the reflection angle of the mirror surface of the rotating mirror 12 is directed to the first fixed mirror 10-1, and a third focal plane 1300-3 formed when the light passes through the mirror surface of the rotating mirror 12 are generated. It can be seen that the focal planes operable with respect to the entire height of the object 100 are formed by combining the focal planes 1300-1, 1300-2, and 1300-3. For convenience of description, the reflected light is not omitted in FIG. 13.

Meanwhile, in the embodiments of the present invention, the image capturing systems for recognizing the moving body are mainly described, but the image capturing systems may be applied to an image inspection device, an image obtaining device, and an image photographing device for various purposes, and their use is not limited to the embodiments of the present invention. Therefore, the moving body may be applied to various uses for photographing and recognizing moving objects as well as logistics.

Figure 14:
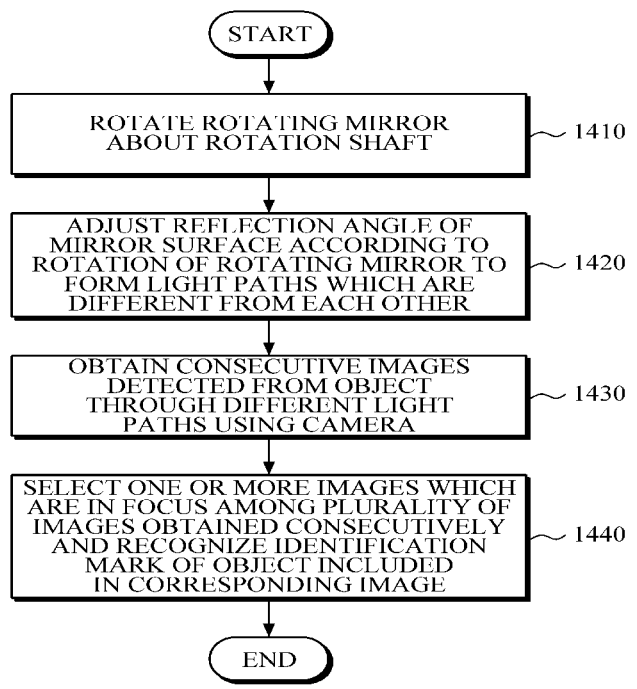
FIG. 14 is a flowchart illustrating an image capturing method according to an embodiment of the present invention.

FIG. 14 is a flowchart illustrating an image capturing method according to an embodiment of the present invention.

Referring to FIG. 14, an image capturing system rotates a rotating mirror about a rotation shaft (1410). In this case, according to a reflection angle of a mirror surface attached to a blade rotating about the rotation shaft when the rotating mirror is rotated, a path of light input to a camera is changed or light passes therethrough (1420). In the rotating of the rotating mirror about the rotation shaft (1410), a rotational speed of the rotating mirror may be synchronized with a frame rate of the camera and the rotating mirror may be rotated so that the camera obtains a direct pass image or a mirror reflection image every frame.

Next, using the camera, images are consecutively obtained from light reflected by the rotating mirror or light passing through the rotating mirror (1430).

In the consecutively obtaining of the images (1430), when the mirror surface of the rotating mirror is opened, the camera detects the light passing through the rotating mirror to obtain a first image of the object and detects the light reflected by the mirror surface of the rotating mirror to obtain a second image of the object. Accordingly, by controlling the reflection angle of the mirror surface of the rotating mirror, the angle of the camera may vary so that different objects may be photographed using a single camera. The objects may be the same or may be different from each other.

In the consecutively obtaining of the images (1430), when the reflection angle of the mirror surface of the rotating mirror is directed to a fixed mirror, the camera detects light reflected by the fixed mirror to obtain a first segmented image of one side of a first object. In addition, when the mirror surface of the rotating mirror is opened, the camera detects the light passing through the rotating mirror to obtain a second segmented image of the other side of the first object. Accordingly, by controlling the reflection angle of the mirror surface of the rotating mirror, a photographing width of the camera is widened, and thus a wide object may be photographed using a single camera.

In the consecutively obtaining of the images (1430), the fixed mirror may be used to change the path of the light reflected by the mirror surface of the rotating mirror or the path of the light passing through the mirror surface of the rotating mirror.

In the consecutively obtaining of the images (1430), when the reflection angle of the mirror surface of the rotating mirror forms the first field of view and the first focal length of the camera so as to have the light path facing the first fixed mirror, the camera may obtain a first image reflected by the first fixed mirror from the object. When the reflection angle of the mirror surface of the rotating mirror forms the second field of view and the second focal length of the camera so as to have the light path facing the second fixed mirror, the camera may obtain the second image reflected by the second fixed mirror from the object. When the third field of view and the third focal length of the camera is formed so as to have a light path through which the mirror surface of the rotating mirror is opened, the camera may obtain a third image passing through the rotating mirror from the object. Accordingly, by controlling the reflection angle of the mirror surface of the rotating mirror, a field of view and a focal length of a single camera may be adjusted.

Next, the image capturing system selects one or more images in focus among the plurality of images obtained consecutively and recognizes an identification mark of the object included in the image (1440).

Furthermore, the method may further include measuring a distance to the object and then selecting a light path for obtaining a focused image from the object on the basis of the measured distance. In this case, in the rotating of the rotating mirror (1410), the rotating mirror may be rotated such that the rotating mirror has a reflection angle forming the selected light path.

While the present invention has been particularly described with reference to the exemplary embodiments, it will be understood by those skilled in the art that various changes in form and details may be made without departing from the spirit and scope of the present invention. Therefore, the exemplary embodiments should be considered in a descriptive sense only and not for purposes of limitation. The scope of the invention is defined not by the detailed description of the invention but by the appended claims and encompasses all modifications and equivalents that fall within the scope of the appended claims and will be construed as being included in the present invention.

The invention claimed is:

1. An image capturing system comprising:
a rotating mirror configured to change a path of light input to a camera or allow light to pass therethrough according to a reflection angle of a mirror surface of the rotating mirror attached to a blade rotating about a rotation shaft;
a mirror driver configured to rotate the rotating mirror; and
the camera configured to obtain an image from light reflected by the rotating mirror or the light passing through the rotating mirror,
wherein the rotating mirror has a plurality of blades which are stacked with respect to the rotation shaft,
the rotation shaft is connected in the form of a universal joint such that the rotation shaft is perpendicular to a mirror surface of each of the blades, and
each of the blades is rotated by being attached to each of nodes of the rotation shaft.

2. The image capturing system of claim 1, wherein
when the plurality of blades of the rotating mirror reveals the camera by rotating, the light passes therethrough directly, and when at least one of the plurality of blades of the rotating mirror covers the camera, the light reflected by the rotating mirror is incident on the camera.

3. The image capturing system of claim 1, further comprising a controller configured to
synchronize a rotational speed of the rotating mirror with a frame rate of the camera to rotate the rotating mirror such that the camera obtains a direct pass image or a mirror reflection image for every frame, and
synchronize a phase of the rotating mirror with a shutter of the camera.

4. The image capturing system of claim 1, wherein, upon the rotation of the rotating mirror, when the mirror surface of the rotating mirror is opened, the camera is configured to
detect the light passing through the mirror surface of the rotating mirror to obtain a first image of an object, and
detect the light reflected by the mirror surface of the rotating mirror to obtain a second image of the object so that an angle of a single camera varies.

5. The image capturing system of claim 4, wherein the object includes objects are the same or are different from each other.

6. The image capturing system of claim 1, further comprising a fixed mirror configured to change a path of the light reflected by or passing through the mirror surface of the rotating mirror.

7. The image capturing system of claim 1, wherein the camera includes:
- a lens; and
- an image sensor of which a sensor surface, on which an image of an object is formed by the light passing through the lens, is disposed not to be perpendicular to a central axis of the lens and to be inclined.

8. An image capturing method comprising:
- rotating a rotating mirror about a rotation shaft;
- changing a path of light input to a camera or allowing light to pass therethrough according to a reflection angle of a mirror surface of the rotating mirror attached to a blade rotating about the rotation shaft when the rotating mirror rotates; and
- consecutively obtaining images from light reflected by the rotating mirror or from the light passing through the rotating mirror using the camera,
- wherein the rotating mirror has a plurality of blades which are stacked with respect to the rotation shaft,
- the rotation shaft is connected in the form of a universal joint such that the rotation shaft is perpendicular to a mirror surface of each of the blades, and
- each of the blades is rotated by being attached to each of nodes of the rotation shalt.

9. The image capturing method of claim 8, wherein, in the consecutively obtaining, upon the rotation of the rotating mirror, when the mirror surface of the rotating mirror is opened, the camera detects the light passing through the mirror surface of the rotating mirror to obtain a first image of an object and detects the light reflected by the mirror surface of the rotating mirror to obtain a second image of the object.

10. The image capturing method of claim 8, further comprising changing the path of the light reflected by or passing through the mirror surface of the rotating mirror using a fixed mirror.

11. The image capturing method of claim 8, wherein, in the rotating of the rotating mirror about the rotation shaft, a rotational speed of the rotating mirror is synchronized with a frame rate of the camera to rotate the rotating mirror such that the camera obtains a direct pass image or a mirror reflection image every frame.

* * * * *